(12) United States Patent
Skarie et al.

(10) Patent No.: US 6,428,334 B2
(45) Date of Patent: Aug. 6, 2002

(54) ADAPTIVE/REACTIVE SAFETY PLUG RECEPTACLE

(75) Inventors: Christopher Jason Skarie, Audubon; Loren Paul Skarie, Vergas, both of MN (US)

(73) Assignee: Power-Off Products, LLC, Detroit Lakes, MN (US)

( * ) Notice: Subject to any disclaimer, the term of this patent is extended or adjusted under 35 U.S.C. 154(b) by 0 days.

(21) Appl. No.: 09/768,380

(22) Filed: Jan. 22, 2001

Related U.S. Application Data

(63) Continuation of application No. 09/223,848, filed on Dec. 31, 1998, now Pat. No. 6,176,718.

(51) Int. Cl.[7] .............................................. H01R 29/00
(52) U.S. Cl. ...................................................... 439/188
(58) Field of Search ................................. 439/188, 489, 439/955; 200/51.1

(56) References Cited

U.S. PATENT DOCUMENTS

| | | | | |
|---|---|---|---|---|
| 4,271,337 A | * | 6/1981 | Barkas | 439/188 |
| 4,591,732 A | * | 5/1986 | Neuenschwander | 307/140 |
| 5,222,164 A | | 6/1993 | Bass, Sr. et al. | 385/14 |
| 5,347,095 A | * | 9/1994 | Zeder | 439/188 |
| 5,465,198 A | * | 11/1995 | Kellohh | 362/253 |
| 5,708,551 A | | 1/1998 | Bosatelli | 361/62 |

FOREIGN PATENT DOCUMENTS

EP 0 621 659 A1 10/1994

* cited by examiner

Primary Examiner—Tulsidas Patel
(74) Attorney, Agent, or Firm—Merchant & Gould P.C.

(57) ABSTRACT

Disclosed is an electrical receptacle which is safe for children yet easy for adults to use. This electrical receptacle provides power only to a properly inserted plug and makes use of one or more sensors which are able to detect blade insertion, ground plug insertion, presence of the plug face motion near the receptacle face or a combination thereof. The receptacle includes a contact assembly adapted and configured to conductively couple each blade of the plug to a conductor, one or more sensors, and a control circuit; wherein the control circuit determines whether or not to provide power to the properly inserted plug by determining if substantially simultaneous insertion has occurred.

23 Claims, 16 Drawing Sheets

ADAPTIVE/REACTIVE SAFETY PLUG RECEPTACLE

This is a continuation of application Ser. No. 09/223,848 filed Dec. 31, 1998, now U.S. Pat. No. 6,176,718.

Background of the Invention

There has been a long-felt need for electrical receptacles or outlets which are safer; especially for children. Conventional electrical receptacles allow several possibly dangerous situations to occur. One situation results from foreign objects such as paper clips or car keys inserted into the receptacle. If the object is conductive, the person holding the foreign object acts as a conductor, thereby permitting current to flow through the object and through the person. This situation is more likely among children. While adults know better than to insert foreign objects into a receptacle, they are nevertheless not immune to the possible dangers. Adults can receive a shock by improperly holding or grasping the plug while inserting or removing it from the receptacle, since it is possible to make contact with one or more of the conducting blades while grasping the plug.

Conventional house electrical systems operate at about 110–120 volts, which is sufficient to possibly cause serious damage. Children are especially vulnerable to the effects of electricity. Consequently, a need has been recognized for safer electrical receptacles.

Some of the more common solutions in the past have utilized mechanical structures which prevent direct insertion of foreign objects. An example includes a plastic device inserted into a receptacle. This device has a flat surface which covers the face of the receptacle and several plastic blades which fit into the receptacle, thereby holding the device firm. While in place, these plugs prevent insertion of any foreign objects into the receptacle. Unfortunately, these plugs can be removed, rendering their safety efficacy nonexistent. If not removed, they present an obstacle to adults who wish to use the receptacle.

Another solution replaces the receptacle cover with a device which prevents direct insertion. One style requires the user to partially insert the plug into the receptacle, and then rotate 90° to gain insertion. Another style includes the same partial insertion step, but requires a subsequent lateral translation to gain complete insertion. These structures can't completely prevent insertion of foreign objects, and can be ungainly as they are mounted in front of the receptacle in place of a conventional receptacle cover.

Other solutions include mechanical switching within a modified receptacle. For example, an inserted plug can have one or more blades that can activate such a switch. Alternatively, the receptacle can require use of a modified plug which contains one or more pins for switch activation. These solutions, unfortunately, include mechanical moving parts which are prone to wear or require the user to replace the plugs on all electrical devices. Further each of these possible solutions require user interaction. Typically, if a user is required to perform additional steps to operate a modified receptacle, they will often not bother and will eventually replace the modified receptacle with a standard outlet.

Another solution includes the use of optics; specifically, a light beam which can be interrupted by plug insertion. Typically, no power would flow while the light beam is uninterrupted, indicating that no plug is present. When a plug is inserted, the light beam is interrupted and power is allowed to flow. This solution may assist in preventing shocks caused by improperly held plugs (since the plug may need to be completely inserted to block the light beam, the user is unable to make contact with the plug blades). Unfortunately, any inserted object of a particular minimum size will block the light beam and permit power to flow. While this avoids the complexity of moving mechanical parts, insertion of most foreign objects would permit current to flow. This solution lacks the sophistication necessary to provide a receptacle which is safe for both children and adults.

A substantial need remains for electrical receptacles which are safe for children yet easy for adults to use. Preferably, such an electrical receptacle would also have the ability to prevent shocks caused by partial plug insertion.

SUMMARY OF THE INVENTION

Accordingly, the invention includes an electrical receptacle which is safe for children yet is easy for adults to use. A novel combination of sensors and circuitry within the receptacle prevent shocks caused by insertion of foreign objects and by improperly grasping a partially inserted plug. The receptacle has one or more plug component sensors that can detect blade insertion, ground prong insertion, presence of the plug face, motion near the receptacle face, or a combination thereof.

The electrical receptacle of the invention can include a plurality of plug component sensors for the purpose of determining the presence or absence of specific geometric features of a standard plug. Examples of plug component sensors include a blade sensor, a ground prong sensor and a face sensor. The electrical receptacle of the invention can utilize any combination of these sensors. Each plug component sensor reports the proximal presence or absence of a plug component or foreign object in the space occupied by the plug component in a properly inserted condition.

In one embodiment, the receptacle of the invention includes a contact assembly, a relay assembly, an LED, a photodetector, a plug component sensor and a control circuit. The contact assembly is adapted and configured to selectively and conductively couple each blade of the plug to the relay assembly while the relay assembly is adapted and configured to conductively couple the contact assembly to conductors. Preferably, the plug component sensor includes a diffuse reflective sensor including the LED and the photodetector; wherein the LED emits light which is reflected by a component of a properly inserted plug and is detected by the photodetector, thereby signaling the control circuit to provide power to the properly inserted plug. A properly inserted plug is defined as one which is completely inserted into the receptacle; thereby permitting power to flow to the plug without risking shock caused by contact with a partially inserted plug.

The invention also includes an electrical receptacle having two or more plug component sensors. In one -embodiment including a control circuit, this permits a control circuit to determine if substantially simultaneous insertion has occurred. Plug geometry requires that a properly inserted plug will present any individual components such as blades and ground prongs at virtually the same time. If individual sensors detect time delayed insertion, it is likely that one or more foreign objects have been inserted. In that situation, the control circuit would not permit power to flow. Substantially simultaneous detection of component insertion can be required to cause power to flow.

The electrical receptacle of the invention includes a contact assembly, which is adapted and configured to conductively couple each blade of the plug to a conductor. For this invention, the electrical state of the contact assembly is determined by the relays, as the contact assembly is conductively coupled to (a) relay(s).

The electrical receptacle of the invention includes a control circuit which determines presence of a properly inserted plug, and may also ensures no activity in the immediate vicinity of the plug, or other features of the receptacle's environment. The electrical receptacle of the invention can utilize any combination of the plug component sensors and any signal analysis method(s). Electrical control which requires substantially simultaneous detection of two or more plug components virtually eliminates the possibility of accidental shock or electrocution as a result of inserting foreign objects.

DETAILED DESCRIPTION OF THE INVENTION

Figure 1:
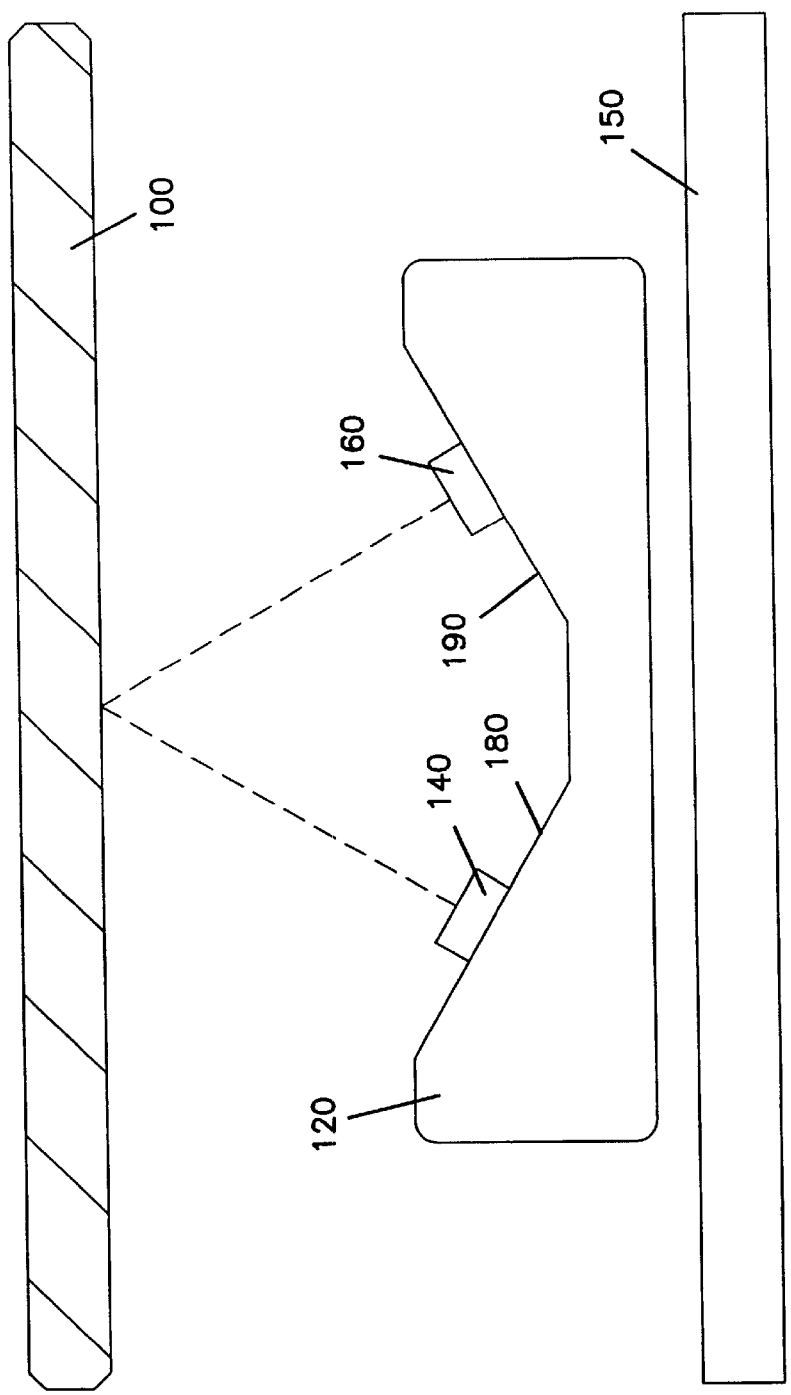
FIG. 1 is a schematic illustration of an embodiment in which a diffuse reflective blade sensor detects the presence of a single inserted blade.

A variety of electrical receptacles are known to those of skill in the art. These receptacles include the traditional 110 V duplex grounded receptacle commonly used in the home and office. Specialty receptacles include those intended for higher voltages, such as for air conditioners and other major appliances. Such typical receptacles can utilize the sensors and circuitry described in the invention.

As used herein, the term "receptacle" refers to a structure which serves to conductively couple an electrical plug to a source of electricity via a contact assembly. A common form of a receptacle is the duplex outlet found in most homes and offices. Typically, these outlets are hardwired into the electrical system, meaning that they are conductively and permanently attached and are typically mounted within a wall. However, the term "receptacle" can also refer to the individual outlets found in outlet strips, and in gang boxes. The female end of an extension cord also qualifies as a receptacle. Typically, outlet strips and extension cords are merely plugged into a hardwired receptacle. Gang boxes are typically plugged in, but are also bolted to the receptacle as a replacement for the receptacle cover.

Receptacles typically include a set of metal (usually copper) conducting pieces within a plastic form. These conducting pieces serve to electrically connect an inserted plug to the home or office electrical system. These metal conducting pieces are, for the sake of this application, described as a contact apparatus which is adapted and configured to conductively couple each blade of a plug to a relay assembly which is conductively coupled to the conductors. The plastic form serves to hold the conducting pieces within the receptacle in proper orientation.

A plug typically has two conducting blades which connect the electrical apparatus to the hot and neutral conducting leads from the electrical system. The electrical apparatus can be any electrical apparatus, such as a light, a radio, television, tool and the like. The plug is attached to conductive leads which are electrically connected to the electrical appliance. A plug may optionally have a ground prong, which serves to electrically connect the electrical apparatus to the ground portion of the electrical system.

An electrical receptacle or outlet serves several purposes. First, it must hold an inserted plug firmly in place. Second, it must serve to electrically connect the inserted plug to the electrical system. A plug can be considered to be the connective portion of an electrical apparatus while an electrical receptacle can be considered to be the connective portion of an electrical system. An electrical system is the source of power to the receptacle, and is typically defined to be the wiring within a home or office. This wiring is conductively connected to each receptacle within the building, and serves to provide electricity to each outlet.

The invention is found in an electrical receptacle which provides power only to a properly inserted plug. Typically, the invention includes a receptacle having two or more plug components sensors that can detect blade insertion, ground plug insertion, presence of the plug face, or the presence of any other specific feature of a standard plug. The receptacle has a contact assembly that is adapted and configured to conductively couple each blade of the plug to a conductor and also has relays, contacts, or any other power control device which can conductively couple the contact assembly to the electrical system. This allows power to be supplied to the receptacle under the direction of the control circuit in the event that the control circuit determines the presence of a properly inserted plug. The receptacle can have a motion detector to determine if there is motion in the immediate vicinity of the receptacle.

The electrical receptacle of the invention also includes a plurality of plug component sensors for the purpose of determining the presence or absence of specific geometric features of a standard plug. Examples of plug component sensors include a blade sensor, a ground prong sensor and a face sensor. The electrical receptacle of the invention can utilize any combination of these sensors. Each plug component sensor reports the proximal presence or absence of a plug component or foreign object in the space occupied by the plug component in a properly inserted condition. Preferably, the plug component sensors are of a "diffuse reflective" type, recognizing that a plurality of sensor types can be used to detect plug components. The diffuse reflective sensor includes an LED and photodetector, which may or may not be modulated, wherein the LED emits light which is reflected by a component of a properly inserted plug or foreign object and is detected by the photodetector, thereby signaling the control circuit the occupation status of the volume of space in the immediate vicinity of the plug component sensor.

The adaptive outlets of the invention preferably include a motion sensor. It is unlikely that a person inserting a plug can remain entirely motionless while inserting a plug. Consequently, it is preferred that the motion detector report to the control circuitry the presence or absence of motion in the immediate vicinity of the receptacle face. The motion detector type is required to function regardless of the mass in the immediate vicinity of the outlet. Should a transformer or bulky plug be inserted, the outlet adapts to the stationary additions to the environment while determining the presence of motion within the vicinity.

The safety aspects of the invention are truly found in the circuitry which controls the adaptive outlet. Preferably, the adaptive outlet includes at least two plug component sensors, thereby permitting the control circuitry to determine the plug component sensors were tripped in a substantially simultaneous fashion; meaning that all plug component sensors present in a receptacle detected their assigned plug components within a short period of time. Electrical control which requires substantially simultaneous detection of two or more plug components substantially eliminates the likelihood of accidental shock or electrocution as a result of inserting foreign objects. Addition of a motion sensor to prevent the power from flowing while motion is present, regardless of the status of the significantly simultaneous plug component detection, substantially eliminates the likelihood of accidental shock caused by contact with partially inserted conductive blades or foreign objects that provide the significantly simultaneous criteria. This feature insures that the receptacle does not supply power while an object or a person's hand is in the immediate vicinity of the outlet. The control circuit can only allow the relay or contact assembly to supply power after any non-stationary object is absent from the area, or has been absent for a pre-determined period of time.

Plug Component Sensors

The purpose of the plug component sensors is to determine the presence or absence of an object in a specific region in space near the receptacle. That space is generally only occupied by a specific geometric feature of a standard plug, but may also be occupied by a foreign object. The adaptive receptacle preferably has at least two plug component sensors. Each plug component sensor reports the proximal presence or absence of a plug component or foreign object in the space occupied by the plug component in a properly inserted condition.

Examples of plug component sensors include blade sensors, ground prong sensors and face sensors. It is recognized that there are many significant features of a standardized plug that would qualify as a recognizable plug component, and as such, can be detected by a sensor. The electrical receptacle of the invention can utilize any combination of these sensors.

Blade Sensors

The diffuse reflective sensor includes an LED and photodetector, which may or may not be modulated, wherein the LED emits light which is diffusely reflected by a component of a properly inserted plug or foreign object and is detected by the photodetector, thereby signaling the control circuit the occupation status of the volume of space in the immediate vicinity of the plug component sensor. Diffuse reflector sensors have the emitting and sensing elements viewing the same side of the target.

Reflection is defined herein as the return of light waves from any surface. A shiny surface such as a mirror is not required. All objects are made visible by the light they reflect. This is often referred to as diffuse reflection.

For this and other sensor types, referral to a "photodetector" indicates that the photodetector is configured to sense light of an appropriate wavelength or modulation as emitted by the LED. Referral to an "LED" indicates that the LED is configured to emit light at any appropriate wavelength at any appropriate modulation. The wavelength and modulation can be selected or determined by one skilled in the art.

One or more reflective surfaces can be used either to reflect the emitted light passing to the receptacle blade aperture, or to reflect the light that passes through the receptacle blade apertures, then continues to the photodetector. Further, fiber optics can be employed in such a way as to allow for positioning of the LED and photodetector anyplace beneficial.

Typically, blade sensors can be employed to detect more than one portion of an inserted blade. For example, a blade sensor can be configured to detect insertion of the distal end (furthest from the plug face) of an inserted blade. This sensor is considered to be a blade tip sensor. Such a sensor can be positioned within a receptacle so that insertion is not detected unless the blade is completely inserted. Alternatively, a blade sensor can be located at a position corresponding to the blade aperture of a fully inserted blade. As the blade is inserted, the sensor acts first as a blade tip sensor, detecting passage of the blade tip past the sensor. Then, the sensor can act as a blade aperture sensor, detecting the presence of the blade aperture, thereby indicating a completely inserted blade. The control circuitry can be designed for either use of a blade sensor.

FIG. 1 shows a typical diffuse reflective blade sensor which includes a single LED and a single photodetector, which are used to detect insertion of a single blade or foreign object. A diffuse reflective sensor can be used to detect any portion of an inserted blade. Seen is a blade 100 with a round aperture (not shown), an LED 140 on a first sloped plane 180, and a photodetector 160 on a second sloped plane 190. These structures are shown in relation to the receptacle 120 and circuit board 150. The LED 140 emits light, some of which can be reflected from the blade 100 to strike the photodetector 160. Consequently, a properly inserted blade 100 is detected by a characteristic amount of emitted light striking the photodetector 160 after being reflected from the blade 100. Too little returned light means that either the LED 140 is burned out or a smaller or light absorbing foreign object has been inserted. In this case, the plug component sensor would indicate a unacceptable condition. If a characteristic amount of light is observed, this plug component sensor would indicate an acceptable condition. If an acceptable condition is reported to the control circuit, the relay assembly will then permit power to flow through the receptacle.

Through beam sensors operate by detecting and reporting to the control circuit incidences of interruption of a light beam by the blades of a properly inserted plug, or by a foreign object. Through beam sensors have a direct or indirect path between an emitting and receiving element. The light source can be an LED or any other source of electromagnetic radiation of any wavelength(s). The photodetector is one that can be matched to detect light from the chosen light source. If the light path is indirect, one or more reflective surfaces can be employed to aim the emitted or reflected light in the necessary direction. Further, fiber optics can be employed in such a way as to allow for positioning of the LED and photodetector anyplace beneficial.

A maximum amount of emitted light will strike the photodetector when no blade is present. If a foreign object or a plug blade is inserted, some or all of the emitted light will be blocked. Consequently, a properly inserted blade is characterized by a total or significant reduction in transmitted light. This method has the disadvantage of being unable to distinguish between a plug blade and an adequately configured foreign object. However, if the sensor is configured so the blade only partially blocks the light path when properly inserted, the control circuit can determine if the LED is still functioning.

Figure 2:
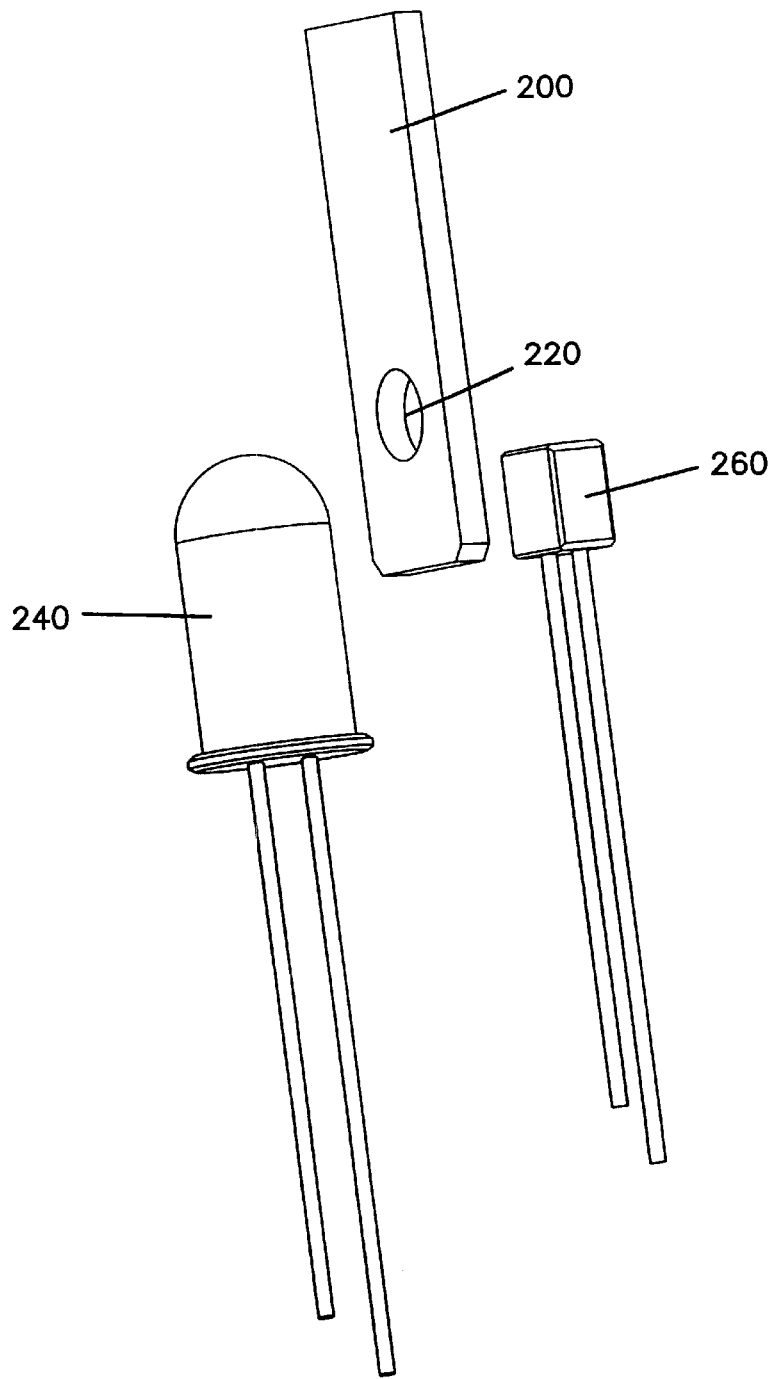
FIG. 2 is a schematic illustration of an embodiment in which a through beam sensor is employed to detect the presence of an inserted blade tip.

FIG. 2 shows a typical through beam blade sensor including a single LED and a single photodetector, which is used to detect insertion of a single blade or a foreign object. In this embodiment, the blade sensor is configured as a blade tip sensor. The figure shows a blade 200 with a round aperture 220. An LED 240 emits light, some or all of which can be blocked from passing through the blade aperture 220 to strike the photodetector 260. Consequently, a properly inserted blade 200 is detected by a characteristic amount of emitted light striking the photodetector 260 after passing through the receptacle blade aperture. A greater than characteristic amount of light means that either no blade 200 is present, or a small object such as a paper clip has been inserted. Too little light means that either the LED 240 is burned out or a larger or adequately shaped foreign object has been inserted. In either case, too little or too much light, the plug component sensor would indicate a unacceptable condition. If a characteristic amount of light is observed, this plug component sensor would indicate an acceptable condition.

Figure 3:
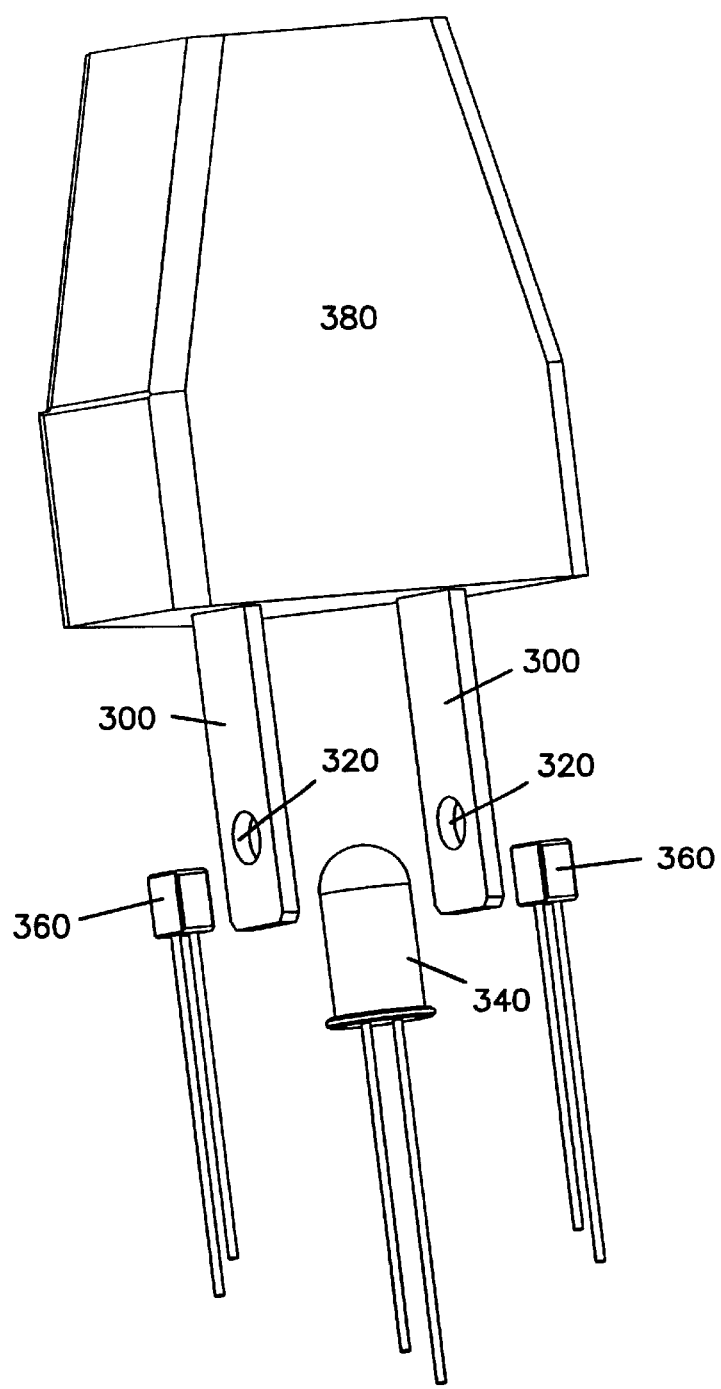
FIG. 3 is a schematic illustration of a through beam sensor in which a distinct LED and photodetector detects each inserted blade tip.

FIG. 3 shows a blade tip sensor embodiment in which a centrally located LED 340 is used to provide incident light which may strike the photodetectors 360. Each blade is seen with an aperture 320. For light to pass successfully through the receptacle blade apertures for each blade 300, the light path must be perpendicular to the long axis of both the blades 300 as well as the axis running the width of the blade 300. As illustrated, one way to do this is to align the LED 340 and the photodetector 360 through the blade apertures. In essence, the LED 340 is aimed directly at the photodetector 360 through the location the blades 300 will reside within the receptacle blade aperture.

Figure 4:
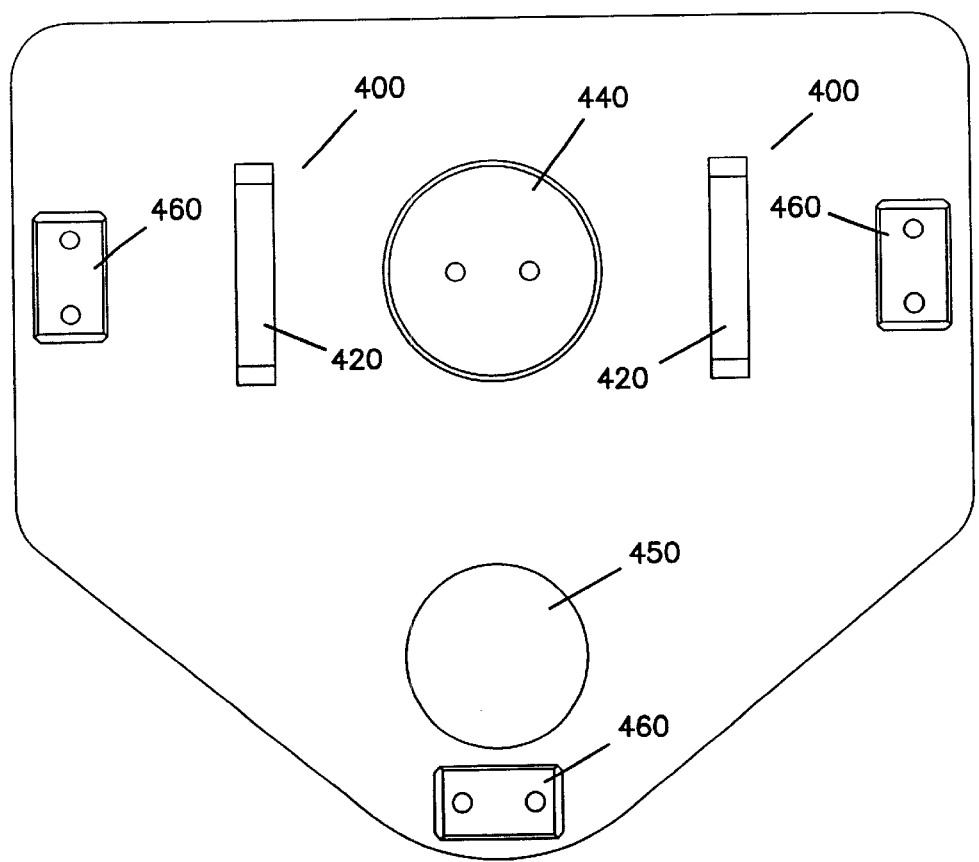
FIG. 4 is a schematic illustration of another through beam sensor in which a single LED emits light which is detected by a pair of photodetectors, each photodetector corresponding to a single inserted blade.

FIG. 4 shows an embodiment having one centrally located common LED 440 to illuminate the corresponding photodetectors 460 for each blade 400 and the ground prong 450. This figure is a heads-on view of an inserted 3 conductor plug. This embodiment may alternatively have any number of prongs or blades or blade apertures to be sensed. Seen is the LED 440, which emits light which can pass through apertures (not shown) in blades 400, thereby striking the photodetector 460. Also noted is the ground prong 450 and the-blades 400, which can prevent the light emitted from the LED 440 from striking the photodetector 460.

It is recognized that there are a variety of sensing methods that may be used as a plug component sensor for the plug blade, including various mechanical sensors. The sensor must be able to provide a signal to the control circuit.

In addition to having two or more blades, many plugs have a ground prong as well, which can also be used for detection of a properly inserted plug, and to insure that the appliance cord is grounded. A ground prong sensor may frequently be used in conjunction with a blade sensor, as seen in the blade hole sensor figure with simultaneous blades and blade holes and prong detection. As with the blade and blade aperture sensors, ground prong sensors can include diffuse reflective and through beam sensors.

Figure 5:
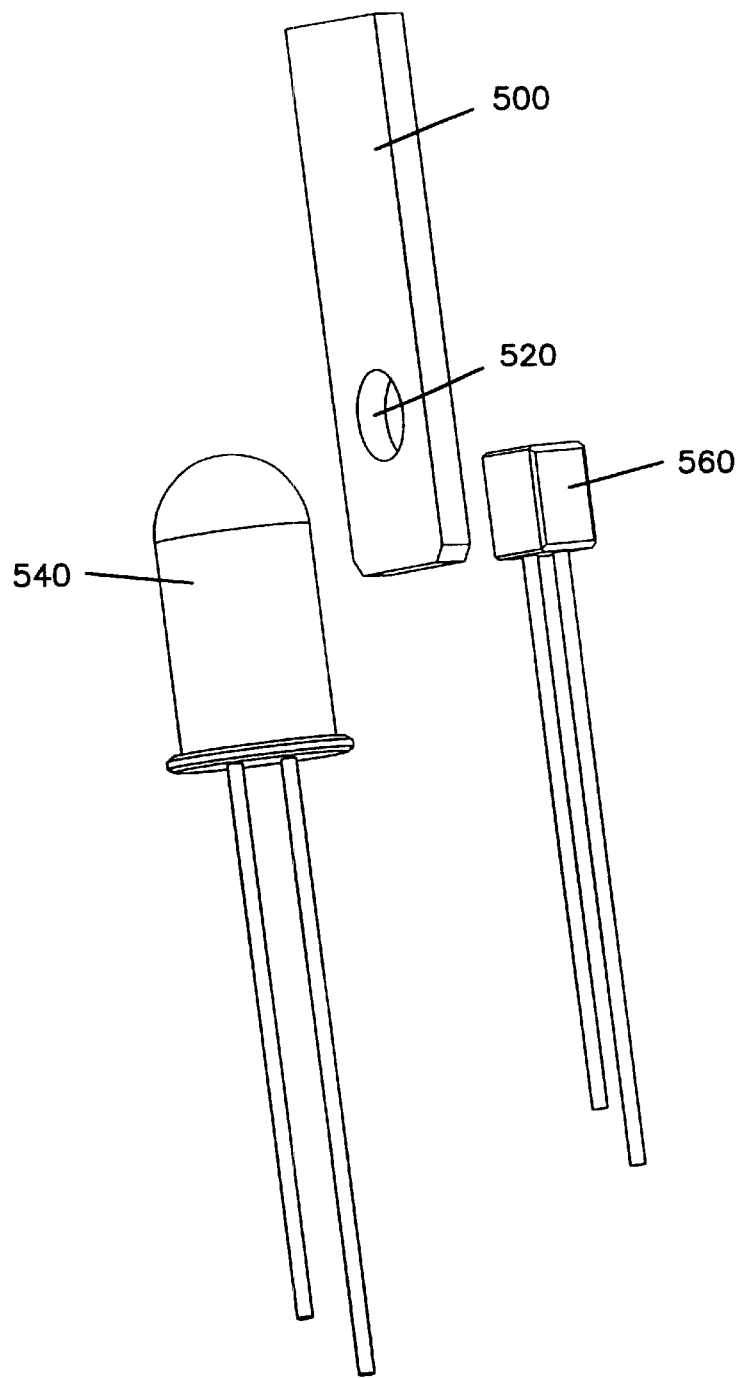
FIG. 5 is a schematic illustration of an embodiment in which a through beam sensor is employed to detect the blade aperture of an inserted blade.

FIG. 5 is similar to FIG. 2, except that it denotes a blade sensor configured as a blade aperture sensor. Seen in the figure is a blade 500 with aperture 520. LED 540 is positioned and configured such that a portion of the emitted light can pass through aperture 520 of properly inserted blade 500 and strike photodetector 560. The amount of incident light on the photodetector 560 indicates to the control circuitry the presence or absence of either a properly inserted plug or a foreign object or improperly inserted plug.

Figure 6:
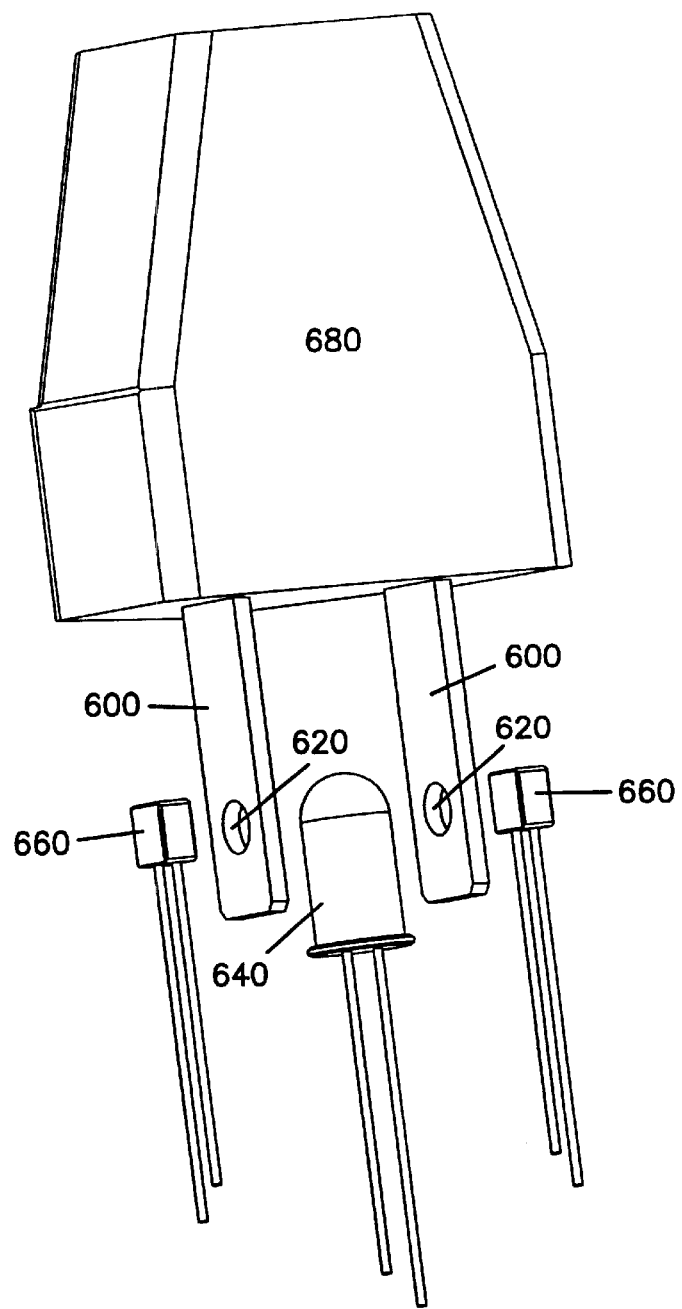
FIG. 6 is a schematic illustration of an embodiment in which a through beam sensor is employed to detect the blade aperture of an inserted blade.

FIG. 6 is similar to FIG. 3, except that it denotes a blade sensor configured as a blade aperture sensor. Unlike FIG. 5, this figure uses a single LED 640 to provide incident light on both photodetectors 660. Seen in the figure is plug body 680, holding blades 600 with blade apertures 620. The LED 640 is positioned and configured such that a portion of the emitted light can pass through apertures 620 of each properly inserted blade 600 and strike each photodetector 660. As before, the amount of light incident on each photodetector 660 signals the presence or absence of a properly inserted plug.

Face Sensors

A face sensor as defined herein relates to a sensor that can detect the presence or absence of an object in the region of space around the receptacle that corresponds to the location of the plug "face" when inserted properly. A plug face is defined as the reasonably flat area located on the body of a plug, between the blades. Face sensors according to the invention can include diffuse reflective sensors, capacitive and acoustic sensors. FIG.

Figure 7:
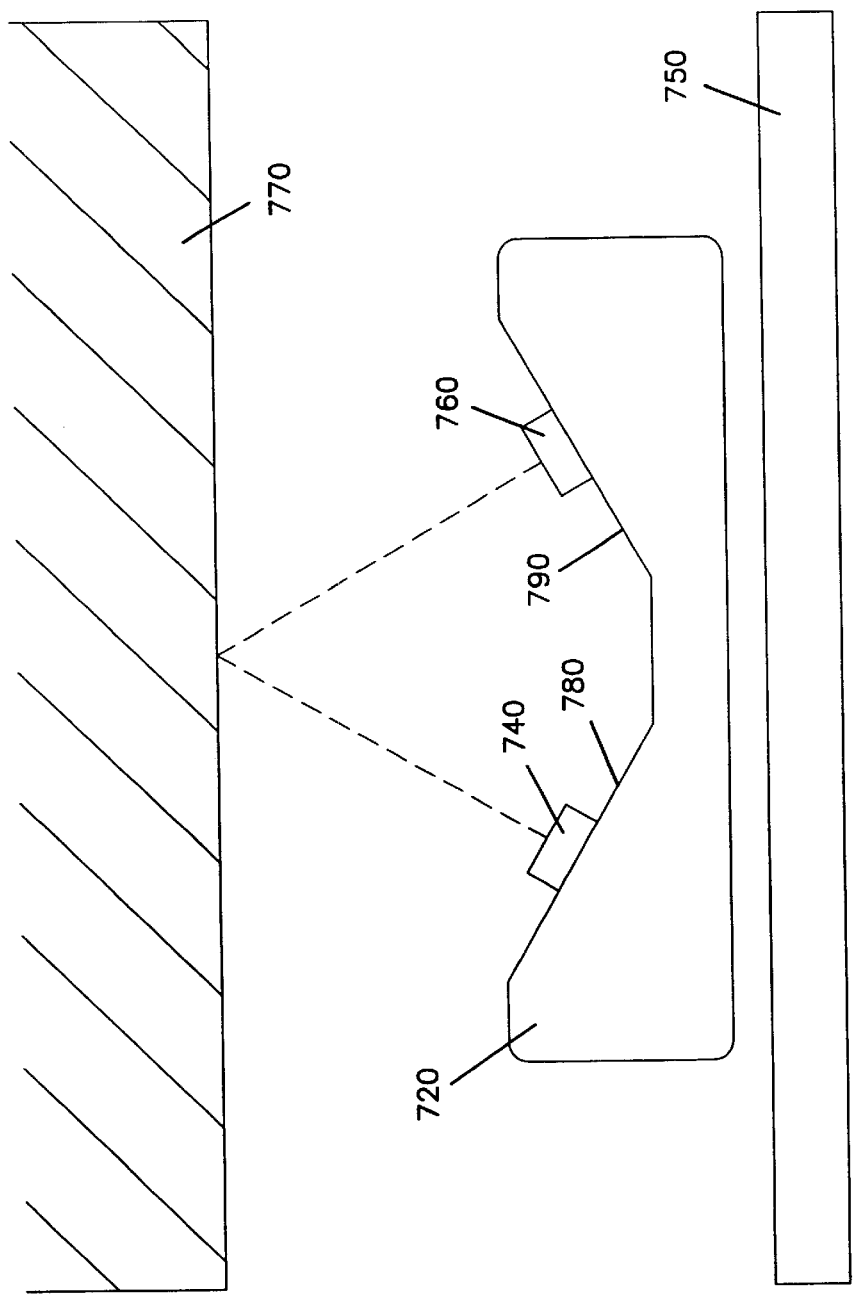
FIG. 7 is a schematic illustration of a face sensor employing a diffuse reflective sensor. In this embodiment, an LED and a photodetector are mounted in sloped planes of the receptacle; permitting a plug face to reflect emitted light back to the photodetector.

FIG. 7 shows a face sensor according to the invention, and includes an LED 740 and a photodetector 760 mounted on sloped planes 780 and 790, respectively on the surface of the receptacle face 720. These planes are angled such that an encroaching plug face 770 will reflect the light emitted by the LED 740 onto the photodetector 760. When no light is present, the emitted light simply angles out away from the receptacle. Also seen in this figure is a circuit board 750. This figure is similar to FIG. 1, however, the sensed component is the plug face 770 as opposed to the blade.

Figure 8:
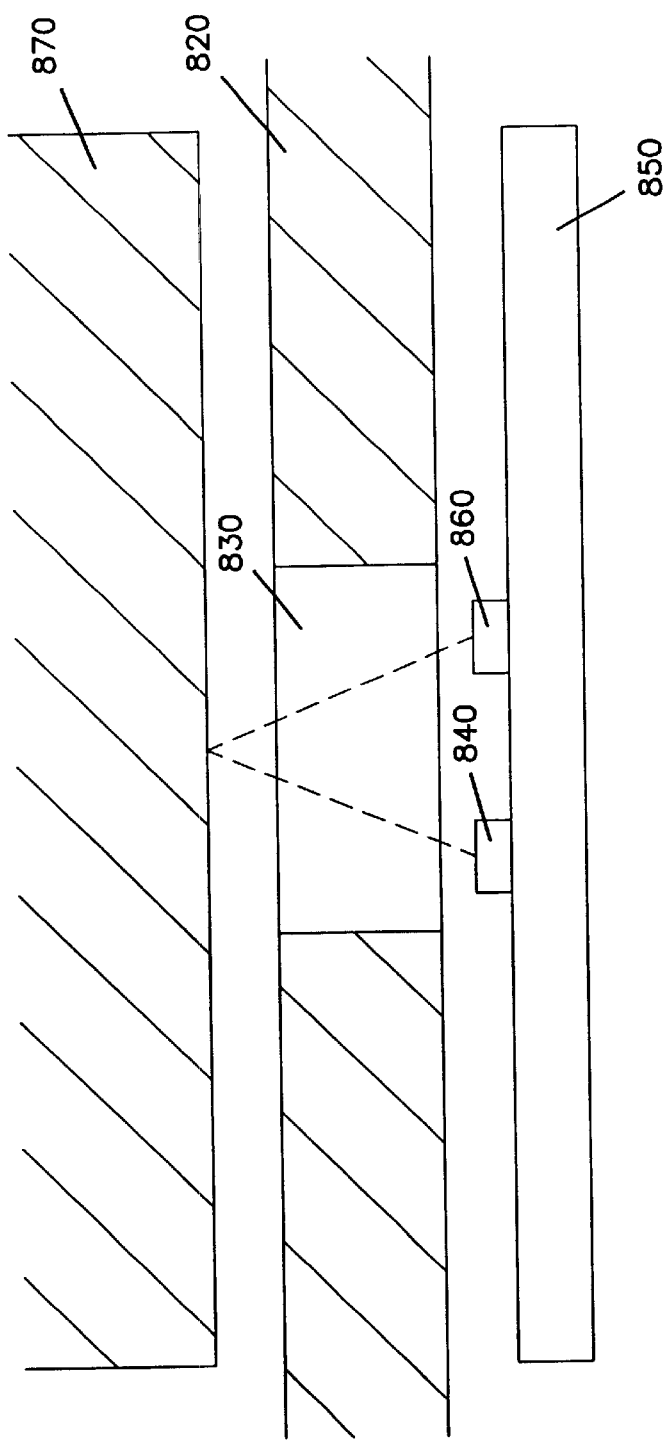
FIG. 8 is a schematic illustration of an alternate embodiment of a face sensor employing a diffuse reflective sensor according to the invention. In this embodiment, the LED and the photodetector are instead mounted within the receptacle; wherein the receptacle contains a clear plastic portion which allows the LED to emit light which can be reflected back (by a plug face) to the photodetector.

FIG. 8 shows an alternative embodiment of the face sensor wherein the LED 840 and photodetector 860 are directly mounted onto the circuit board 850. In this case, the LED emits light which can pass through the transparent block 830, strike the plug face 870, and then is reflected back through the transparent block 830 to the photodetector 860. This embodiment has the advantage of not requiring the LED or photodetector to be exposed on the surface of the receptacle. Also, the transparent plastic may be transparent or opaque in the wavelengths of the emitter. It is not required to be transparent or opaque in any other frequencies. This would allow the use of black, IR transparent plastic for the window. This type of application can also work for blade and blade aperture sensors.

Capacitive sensors monitor for changes in the dielectric constant between capacitor plates with known properties. Placement of an object (the plug) near the sensor causes the material in front of the capacitor insulation to change from air to plastic, thus changing the dielectric constant of the material in the field lines of the plate. This dielectric constant change causes a change of capacitance between the two plates. The change of capacitance is easily monitored by circuitry known to one skilled in the art.

Acoustical sensing employs a sound emitter and a microphone. When the plug face is not present, the sound emitter projects acoustical energy away from the receptacle. This sound may be of nearly any reasonable frequency or intensity. If the plug face is present, a portion of the acoustic energy will be reflected back towards the receptacle, and to the microphone. In the presence of a seated plug, the acoustical energy entering the microphone will be higher than with no plug.

It is recognized that there are a variety of sensing methods that may be used as a plug component sensor for the plug face. One of skill in the art will realize that any geometrical feature of the outlet may be sensed, and qualify as a legitimate plug component sensor location. Any of the mentioned plug component sensors, as well as others, can be used as a sensing method for these additional sensors.

Motion and Proximity Sensors

Another source of electrical shock results from making contact with the exposed conducting blades of a partially inserted plug. It is therefore desirable to determine if there is motion in the immediate vicinity of the outlet. Thus, the outlets of the invention preferably include a motion sensor. It is unlikely that a person inserting a plug or a foreign object can remain entirely motionless. Consequently, it is preferred that the motion detector report to the control circuitry the presence or absence of motion in the immediate vicinity of the receptacle face.

In this instance, "immediate vicinity" is defined as within about 8 cm, preferably no more than about 4 cm of the receptacle. The motion detector type is required to function regardless of the mass in the immediate vicinity of the outlet. Should a transformer or bulky plug be inserted, the outlet adapts to the stationary additions to the environment while still determining the presence of motion within its immediate vicinity.

One such technology employs capacitive plates, and is called a capacitive sensor. As discussed, capacitive sensors monitor for changes in the dielectric constant between capacitor plates with known properties. The output of a capacitive sensor can also be AC coupled, effectively allowing only the effects of motion of a mass in the immediate vicinity of the capacitive sensor to affect the sensor output. These flat plates can be mounted behind the receptacle cover, as well as other locations, and can change their capacitance according to the dielectric constants of all of the materials within the field lines of the plates. Consequent of that, and the AC coupling, this sensing method can be adapted to various installation options, as the sensing plates can be mounted behind any designer or styled receptacle cover, and the motion detection circuitry allows only the properties from only moving objects to affect the output of the sensor.

As previously mentioned, a source of electrical shock results from making contact with the exposed conducting blades of a partially inserted plug. It may then be desirable to determine if there is an object present somewhere in the immediate vicinity of the outlet. Thus, the outlets of the invention preferably include a proximity sensor. It is unlikely that a person inserting a plug or a foreign object can entirely avoid certain regions in space around the receptacle. Consequently, it is preferred that the proximity detector report to the control circuitry the presence or absence of motion in the immediate vicinity of the receptacle face. In this instance, "immediate vicinity" is defined as within about 10 cm, preferably no more than about 5 cm of the receptacle An optical sensor that may be used for motion detection would monitor for changes in optical intensity near the receptacle. Provided a light source is embedded on the surface of the receptacle for the purpose of illuminating any object in front of the receptacle, but within a cone defined by the optics of the light source, and the photodetector is configured with optics to view a conical shaped area that intersects the light cone, the optical intensity received by the photodetector will change if an object enters the intersection of the two cones. An increase in the received optical intensity would then constitute a unacceptable condition.

Figure 9:
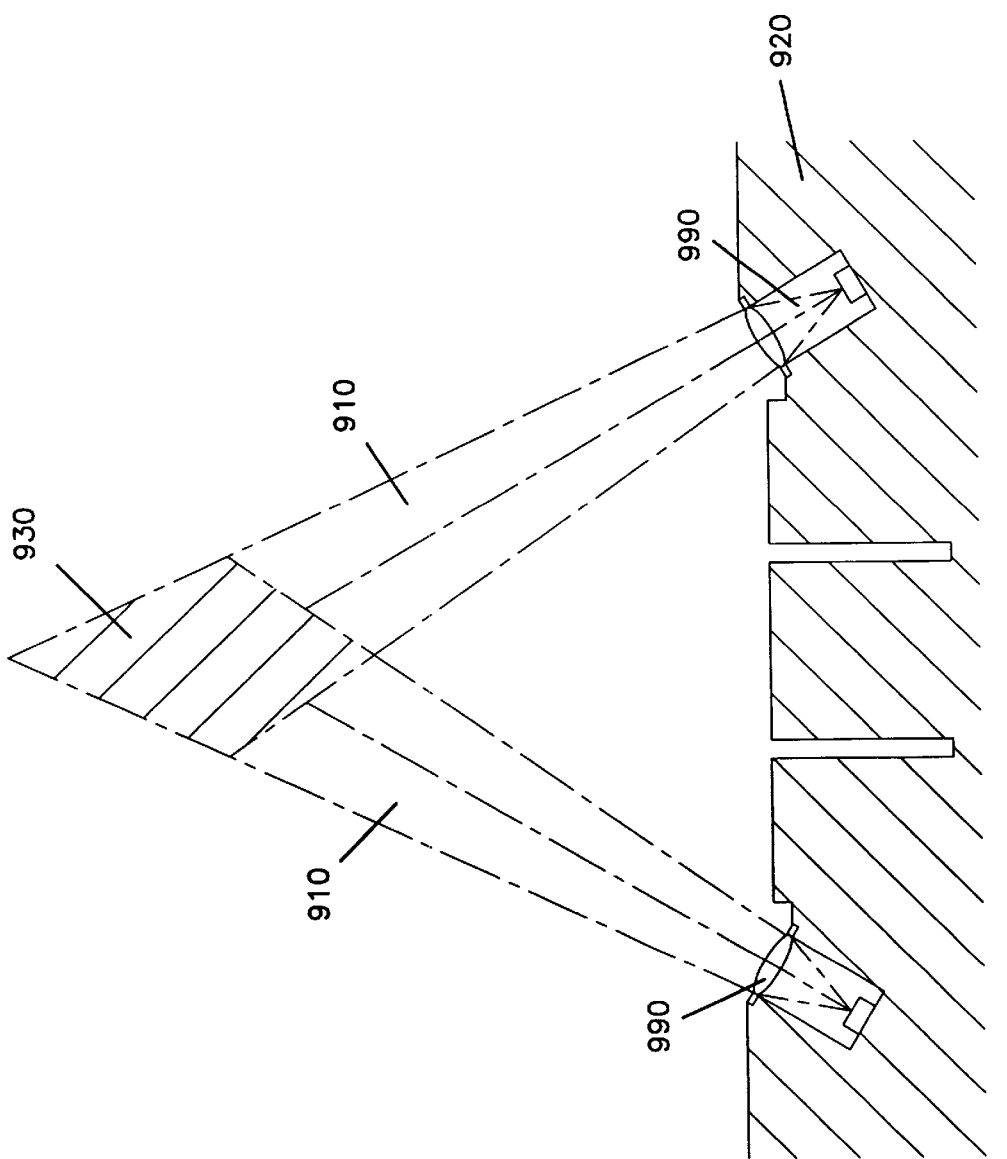
FIG. 9 is a schematic illustration of an optical sensor according to the invention. An optical sensor can be employed to detect either motion or proximity.

FIG. 9 shows an embodiment of an optical sensor which can sense either motion or proximity. A moving object which intersects one or more of the light beams will change the amount of light incident on the photodetector. A stationary object will have much the same effect, particularly if such an object intersects with the conical light zone which results from the intersection of one or more light beams. Receptacle face 920 is seen, holding two or more light sources 990. Each light source creates a light beam 910, which intersects with any other light beams to create a conical shaped light zone 930.

Contact Assembly

The electrical receptacle of the invention includes a contact assembly, which is adapted and configured to conductively couple each blade of the plug to a conductor. For this invention, the electrical state of the contact assembly is determined by the relays, as the contact assembly is conductively coupled to (a) relay(s).

The relay assembly is adapted and configured to conductively couple each blade contact of the receptacle to the hot and neutral conductors of an electrical system under the direction of commands sent from the control circuit. The relay circuitry may be either NO or NC in function, NO representing a 'power upon proper insertion' control circuitry, and NC representing a 'power revoked for improper insertion' control circuitry. The relay can be a power FET or other known power control device.

The electrical receptacle of the invention includes a control circuit which determines presence of a properly inserted plug, and may also ensures no activity in the immediate vicinity of the plug, or other features of the receptacle's environment. The electrical receptacle of the invention can utilize any combination of the plug component sensors and any signal analysis method(s). In general, if one or more control circuits mentioned below are used and determine an unacceptable condition, any of them may revoke power to the receptacle.

The electrical receptacle of the invention may alternatively include a control circuit which revokes power to a receptacle after an improper insertion has been detected, subject to reset or reactivation with a proper insertion.

Control Logic

Electrical control which requires substantially simultaneous detection of two or more plug components virtually eliminates the possibility of accidental shock or electrocution as a result of inserting foreign objects.

A properly inserted plug will present it's standardized geometry to strategically placed plug component sensors at almost the same time, that is, 'substantially simultaneously.' In order to use this type of signal analysis method, the invention preferably has at least two plug component sensors, thereby permitting the control circuitry to determine if substantially simultaneous plug component detection has occurred. More specifically, substantially simultaneous means that the required plug components arrive in the presence of the individual plug component sensors within a short period of time; meaning that all plug component sensors present in a receptacle detected their assigned plug components within a short period of time. This period of time should be less than 1 s, preferably less than about 350 ms.

Figure 10:
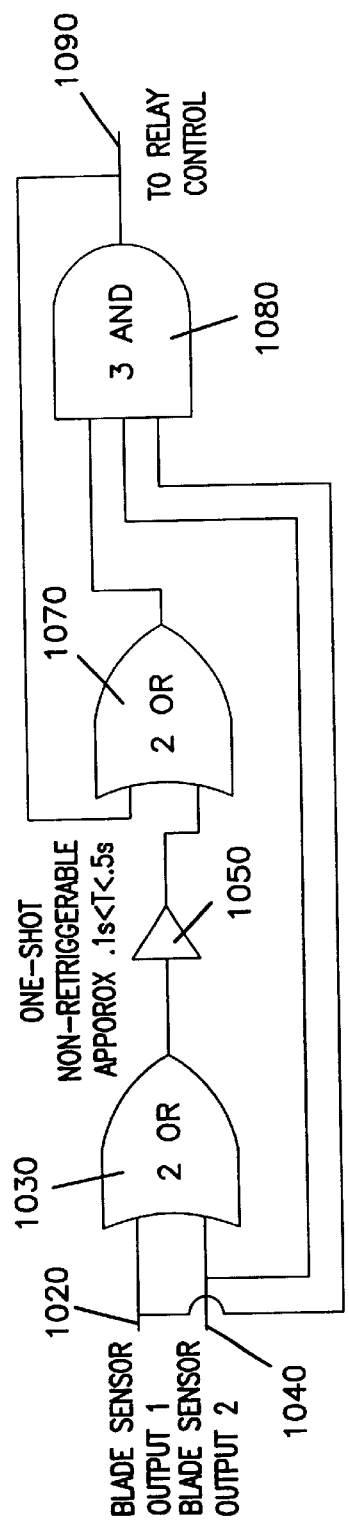
FIG. 10 is a circuit schematic illustrating the circuitry necessary to control an embodiment having two blade sensors.

FIG. 10 shows a electrical schematic suitable for an embodiment having a pair of blade sensors. Seen in the schematic is an OR gate 1030, a second OR gate 1070 and a third OR gate 1080. Also seen is a one shot timer 1050. This circuit receives signals 1020 and 1040 from the blade sensors and ultimately sends a signal 1090 to the relay assembly. If one of the blade sensors detects insertion, the one shot timer 1050 defines a predetermined period of time in which the second blade sensor must also detect insertion. This circuit illustrates the substantially simultaneous requirements of the invention as pertaining to an embodiment employing a pair of blade sensors. These blade sensors can be configured as blade tip sensors, blade aperture sensors or can be configured to detect other portions of a blade as well.

Figure 11:
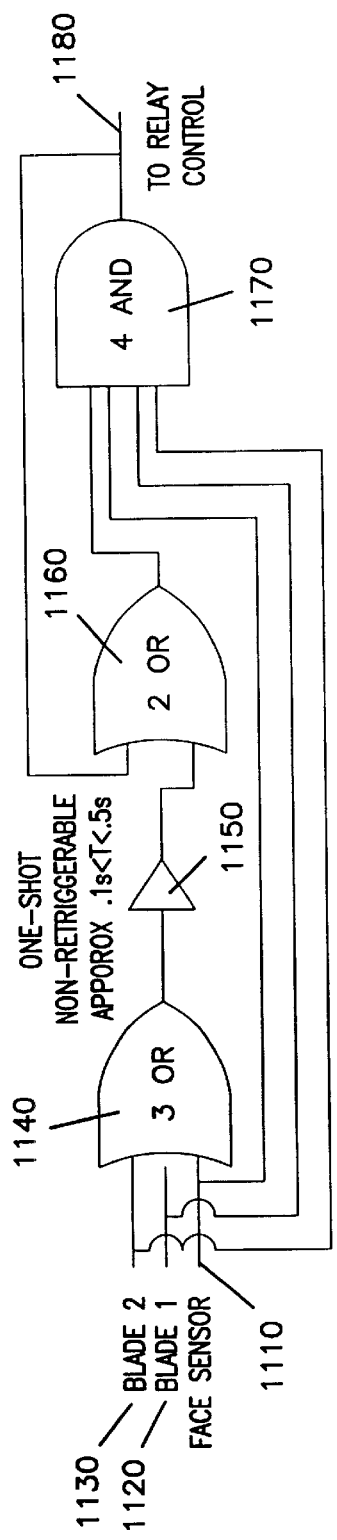
FIG. 11 is a circuit schematic illustrating the circuitry necessary to control an embodiment having two blade sensors and a face sensor.

FIG. 11 shows a similar electrical schematic, albeit for an embodiment which also utilizes a face sensor. Seen in the schematic is an OR gate 1140, a second OR gate 1160 and a third OR gate 1170. Also seen is a one shot 1150. This circuit receives signals. 1110, 1120 and 1130 from the two blade sensors and the face sensor, respectively, and ultimately sends a signal 1180 to the relay assembly. If one of the blade sensors detects insertion or the face sensor detects an impinging plug face, the one shot timer 1050 defines a predetermined period of time in which the remaining sensors must also detect insertion. This circuit illustrates the substantially simultaneous requirements of the invention as pertaining to an embodiment employing a pair of blade sensors and a face sensor.

While it is unlikely that two plug blades is inserted exactly simultaneously, plug design dictates, for example, that insertion of one blade will follow very closely with insertion of a second blade. This requirement means it is much less likely that a person can receive a shock as a result of insertion of foreign objects into the receptacle. It is unlikely that a person, especially a child, can insert multiple conducting foreign objects into the receptacle and activate all of the plug component sensors at essentially the same time.

Electrical control may require substantially simultaneous detection of a blade tip and a blade aperture. Upon the event that a blade aperture sensor detects an object in it's sensing area, it must cease to sense that object and a blade tip must be sensed with a separate plug component sensors within a short period of time. This period of time should be less than about 1 s, preferably less than about 300 ms.

Figure 12:
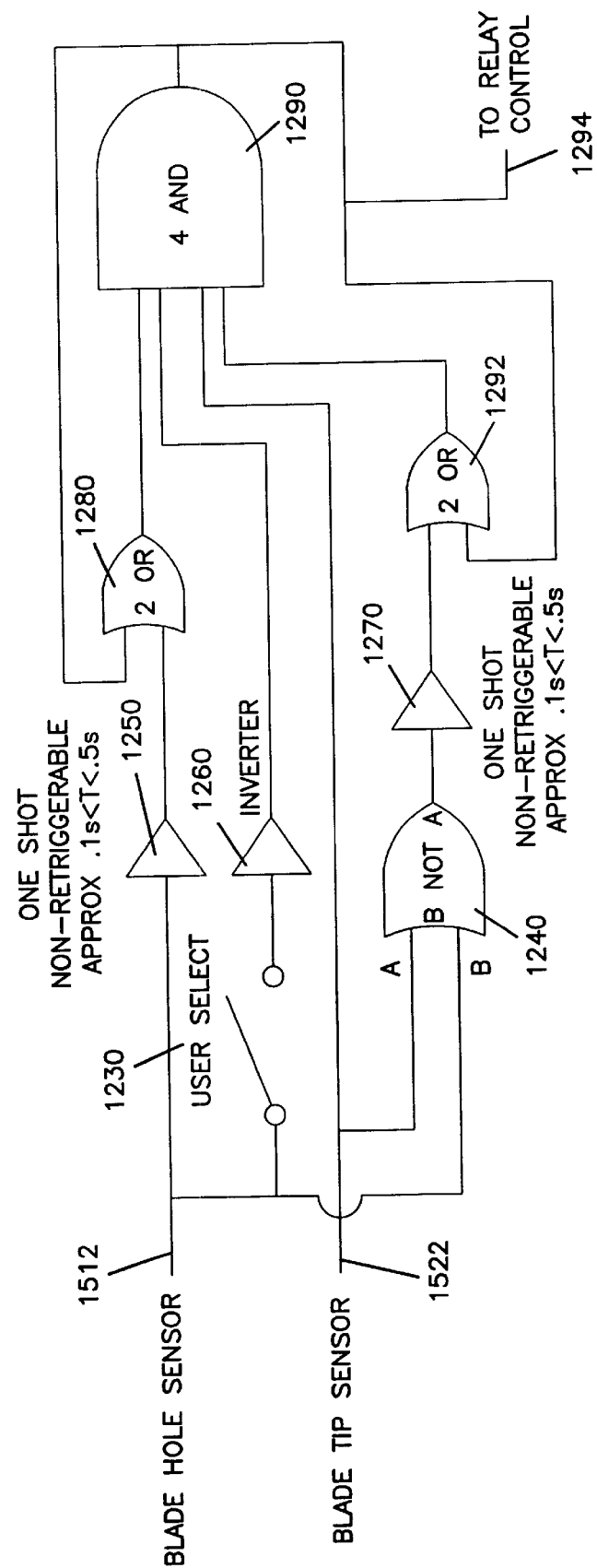
FIG. 12 is a circuit schematic illustrating the circuitry necessary to control an embodiment having both a blade tip sensor and a blade aperture sensor. A user-removable jumper allows the user to determine if the receptacle requires sequential detection of a blade tip followed by the blade aperture.

FIG. 12 illustrates an embodiment in which the concept of substantially simultaneous is merged with that of sequential timing. This embodiment employs both a blade tip sensor and a blade aperture sensor. As noted, a single sensor can be configured for both tasks, or separate sensors can be included. In either case, the circuit requires a blade aperture-sensor signal 1210 and a blade tip sensor signal 1220. If the user select jumper 1230 is left intact, the circuit requires that detection of the blade aperture occur within a very short period of time after detection of an inserted blade tip. This feature can be employed to require insertion only of specially configured plugs. For example, the blade tip to blade aperture distance can be altered.

If the user select jumper 1230 is removed, the circuit would then function in the substantially simultaneous mode previously discussed. Also seen in the figure are blade aperture sensor one shot timer 1250 and blade tip sensor one shot timer 1270, along with 2 OR gates 1280 and 1292. If the user select jumper 1230 is removed, inverter 1260 becomes meaningless. Also seen is decision gate 1240 and 4 AND gate 1290. Finally, the circuit provides a signal 1294 to the unseen relay assembly.

Plug design dictates that detection of an object in the area of the blade aperture will closely follow with detection of an object in the area of the blade tip and an absence of an object in the area of the blade aperture in the event of a properly inserted plug. This requirement means it is much less likely that a person can receive a shock as a result of insertion of foreign objects into the receptacle. It is unlikely that a person, especially a child, can insert a conducting foreign objects with a tip geometry similar to a plug blade.

Unacceptable Conditions

Electrical control can require a "stable" lack of motion within the immediate vicinity of the receptacle, insuring that the receptacle does not supply power while an moving or temporarily stationary object is in the immediate vicinity of the outlet. This virtually eliminates the possibility of accidental shock or electrocution as a result of inserting foreign objects.

The control circuit may only allow the relay to supply power to the contact assembly after any non stationary object is absent from the area, and has been absent from the area for a predetermined period of time. Preferably, this time period is less than 1 s.

Addition of a motion sensor to prevent the power from flowing while motion is present, regardless of the state of the substantially simultaneous plug component detection, virtually eliminates the possibility of accidental shock caused by contact with partially inserted conductive plug blades or foreign objects that provide the significantly simultaneous criteria.

Electrical control can require a lack of motion within the immediate vicinity of the receptacle, insuring that the receptacle does not supply power while an moving object is in the immediate vicinity of the outlet. This virtually eliminates the possibility of accidental shock or electrocution as a result of inserting foreign objects. The control circuit may only allow the relay to supply power to the contact assembly after any non stationary object is absent from the area.

Addition of a motion sensor to prevent the power from flowing while motion is present, regardless of the state of the significantly simultaneous plug component detection, virtually eliminates the possibility of accidental shock caused by contact with partially inserted conductive plug blades or foreign objects that provide the significantly simultaneous criteria. This control method has a faster response than the motion with delay option.

Electrical control can require an absence of objects within a defined area in front of the receptacle, insuring that the receptacle does not supply power while an object is in the immediate vicinity of the outlet. This virtually eliminates the possibility of accidental shock or electrocution as a result of inserting foreign objects.

Figure 13:
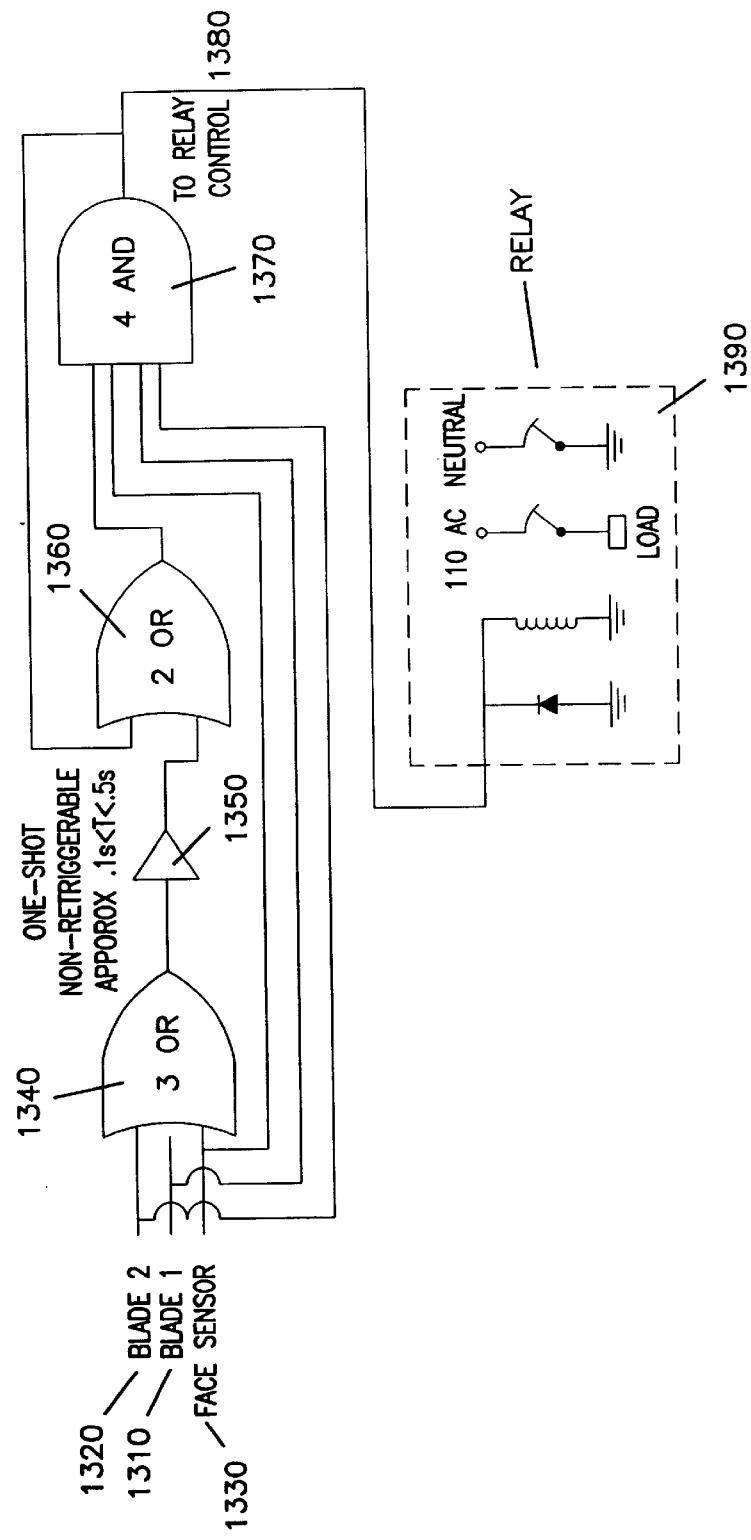
FIG. 13 is a circuit schematic illustrating the circuitry necessary to control an embodiment having two blade sensors and a face sensor. This schematic also shows an optional relay assembly.

FIG. 13 illustrates the circuitry required by a preferred embodiment in which two blade sensors and a face sensor are used. This figure is quite similar to FIG. 10, with the exception that this figure also shows relay assembly 1390. Otherwise, the figure shows blade sensor signals 1310 and 1320, along with face sensor signal 1330. One shot timer 1350 provides a predetermined period of time in which the remaining sensors must report detection after initial detection by one of the three sensors.

Figure 14:
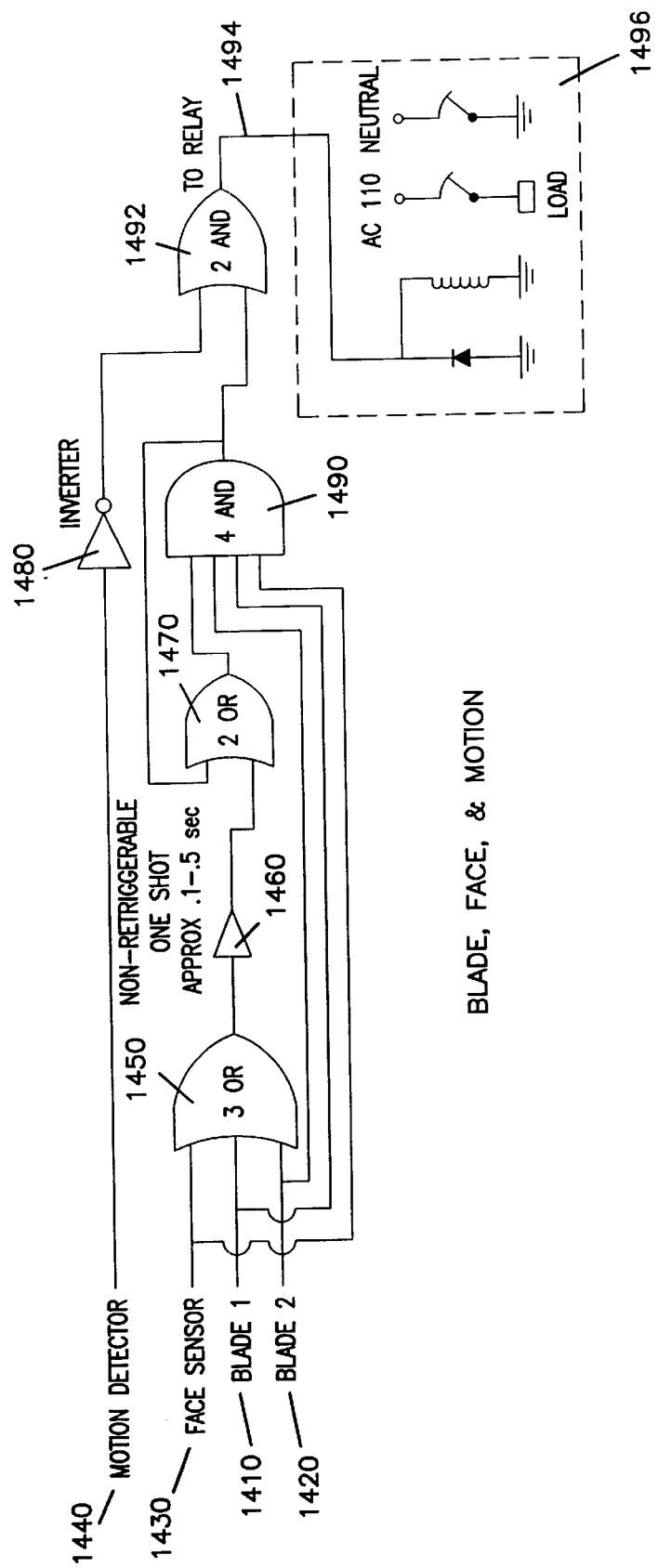
FIG. 14 is a circuit schematic illustrating the circuitry necessary to control an embodiment having two blade sensors, a face sensor and a motion detector. This schematic also shows an optional relay assembly.

FIG. 14 illustrates the circuitry required by a preferred embodiment in which two blade sensors, a face sensor and a motion detector are all used. This figure is similar to FIG. 10, with the exception of the motion detector signal 1440 and the relay assembly 1496. Also unique to this circuit are the inverted 1480 and the 2 AND gate 1492. The 2 AND gate 1492 requires that the motion detector report a lack of motion near the receptacle while the rest of the circuit also reports a properly inserted plug. This prevents accidental shock caused by improperly grasping a partially inserted plug. Otherwise, the figure shows blade sensor signals 1410 and 1420, along with face sensor signal 1430. One shot timer 1460 provides a predetermined period of time in which the remaining sensors must report detection after initial detection by one of the other sensors.

Figure 15:
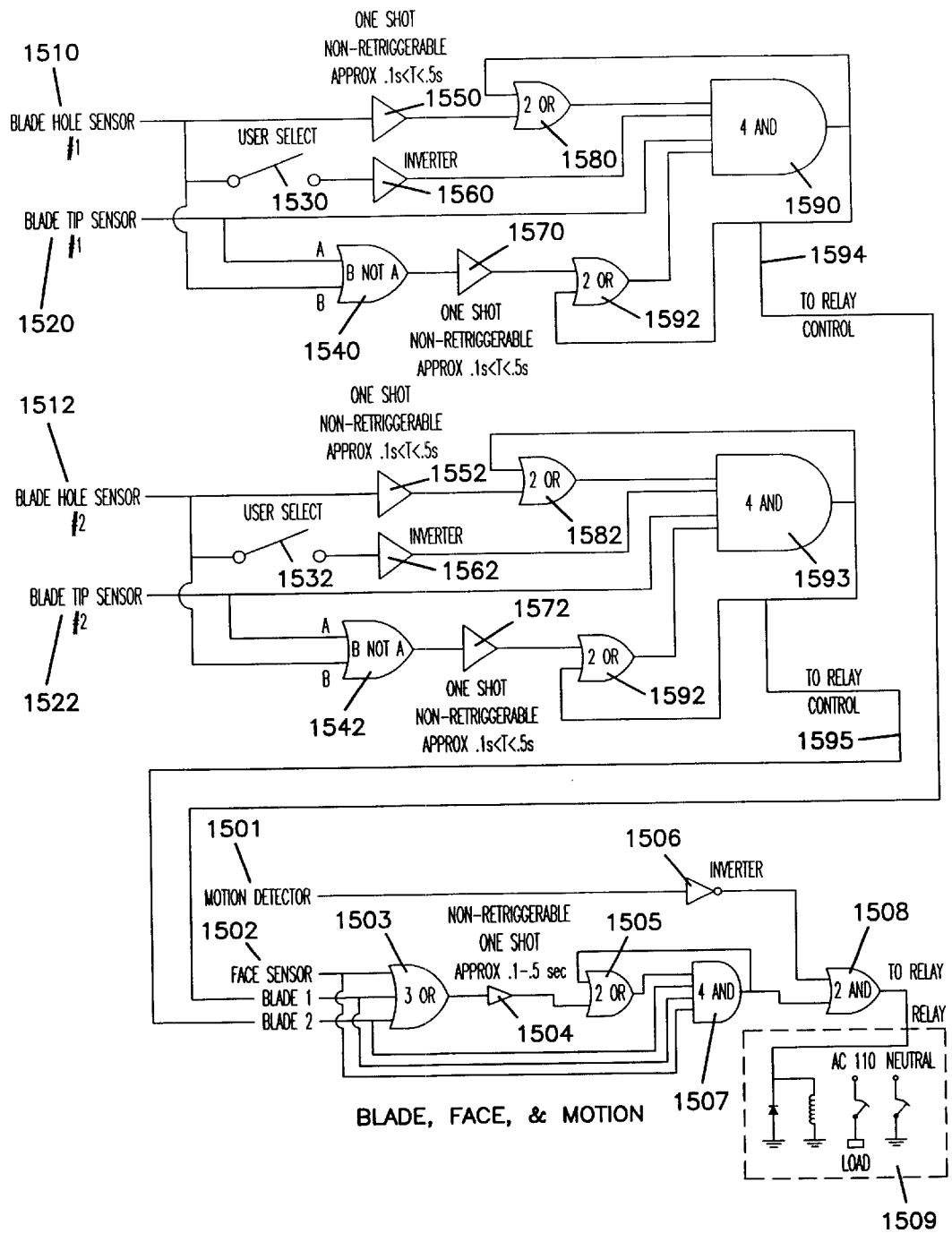
FIG. 15 is a circuit schematic illustrating the circuitry necessary to control an embodiment having a blade tip sensor, a blade aperture sensor, a face sensor and a motion detector. A user-removable jumper allows the user to determine if the receptacle requires sequential detection of a blade tip followed by the blade aperture.

FIG. 15 illustrates the circuitry required by a preferred embodiment in which two blade tip sensors are used in conjunction with two blade aperture sensors in a user-selected sequential insertion detection mode. This portion of the circuit is quite similar to FIG. 12, except that it is repeated for each blade. Satisfactory sequential detection of blade tip and blade aperture (for each blade) signals to the remaining circuit that both blades have been properly inserted. The final portion of the circuit, which is quite similar to FIG. 14, requires that both blades be properly inserted and the plug face be detected within a predetermined period of time. The circuit also requires that there be no motion in the vicinity of the receptacle.

The first portion of the circuit receives blade tip sensor signal 1510 and blade aperture sensor signal 1520. If the user select jumper 1530 is left intact, the circuit requires that detection of the blade aperture occur within a very short period of time after detection of an inserted blade tip. This feature can be employed to require insertion only of specially configured plugs. For example, the blade tip to blade aperture distance can be altered.

If the user select jumper 1530 is removed, the circuit would then function in the substantially simultaneous mode previously discussed. Also seen in the figure are blade aperture sensor one shot timer 1550 and blade tip sensor one shot timer 1570, along with 2 OR gates 1580 and 1592. If the user select jumper 1530 is removed, inverter 1560 becomes meaningless. Also seen is decision gate 1540 and 4 AND gate 1590. Finally, a signal 1594 is provided to the third portion of the circuit.

The second portion of the circuit is very similar to the first. Blade aperture sensor signals 1512 and 1522 are provided to the circuit. Seen in the figure are one shot timers 1552 and 1572, along with inverter 1562. OR gates 1582 and 1592 are also present, as are decision gate 1542 and 4 AND gate 1593. Finally, this portion of the circuit provides a signal 1595 to the third portion of the circuit.

The third portion of the figure is quite similar to FIG. 14, which is similar to FIG. 10, with the exception of the motion detector signal 1501 and the relay assembly 1509. Also unique to this circuit are the inverter 1506 and the 2 AND gate 1508. The 2 AND gate 1508 requires that the motion detector report a lack of motion near the receptacle while the rest of the circuit also reports a properly inserted plug. This prevents accidental shock caused by improperly grasping a partially inserted plug. One shot timer 1504 provides a predetermined period of time in which the remaining sensors must report detection after initial detection by one of the other sensors. Blade sensor inputs 1594 and 1595 are provided from the earlier portions of the circuit. Face sensor signal 1502 is also present.

Figure 16:
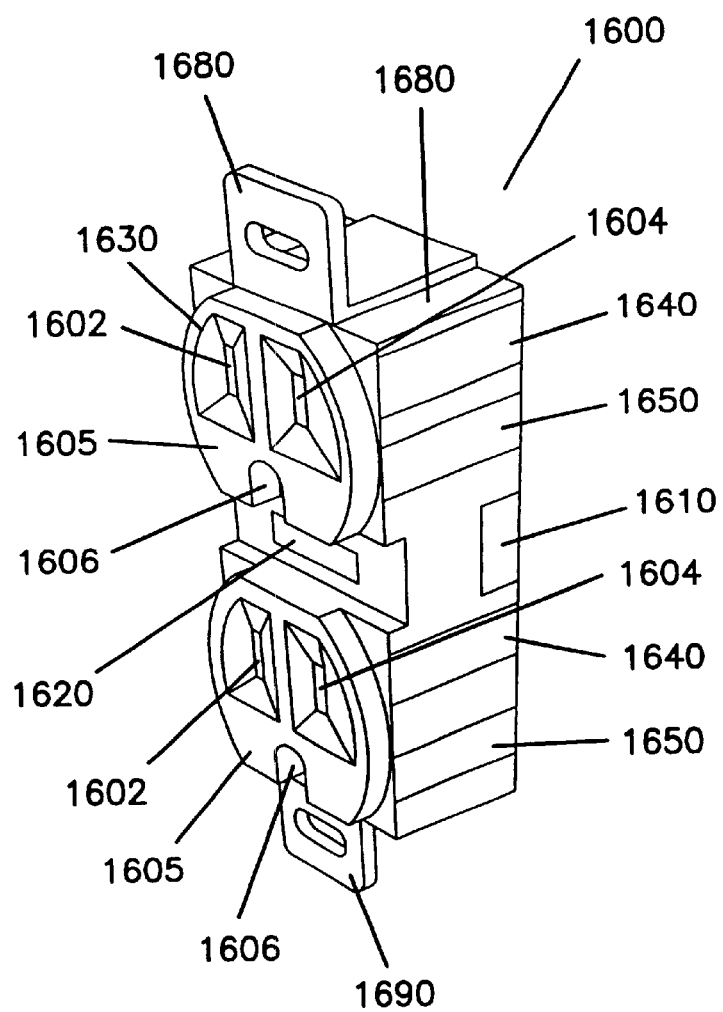
FIG. 16 is a schematic illustrating an adaptive receptacle according to the invention.

FIG. 16 illustrates a typical adaptive receptacle according to the invention. Seen is a receptacle 1600, with a typical body 1680. Across the front of the receptacle (as installed), receptacle faces 1605 are seen, each bearing blade receptacle apertures 1602 and 1604, as well as ground prong receptacle aperture 1606. Other typical features include mounting lugs 1690. The figure also illustrates the novel combinations of sensors and circuitry which make up the invention. Shown between blade receptacle apertures 1602 and 1604 are face sensors 1630. Motion or proximity sensor 1620 is shown positioned between receptacle faces 1605. Along the side of the receptacle 1600 are seen blade sensors 1640 and ground prong sensors 1650.

The above specification and examples provide a complete description of the manufacture and use of the composition of the invention. Since many embodiments of the invention can be made without departing from the spirit and scope of the invention, the invention resides in the claims hereinafter appended.

We claim:

1. An electrical receptacle which provides power only to a properly inserted plug, said receptacle comprising:

a contact assembly, a relay assembly, two plug component sensors, and a control circuit the contact assembly being adapted and configured to conductively couple each blade of the plug to the relay assembly; the relay assembly being adapted and configured to conductively couple the contact assembly to conductors;

wherein after the control circuit determines improper insertion of an object into the receptacle, the control circuit provides power only after determining presence of a properly inserted plug and after substantially simultaneous sensing by the plug component sensors.

2. The electrical receptacle of claim 1, wherein the control circuit determines substantially simultaneous insertion of plug components.

3. The electrical receptacle of claim 1, wherein the control circuit provides power if at least two plug component sensors sense plug components within a period of about 100 to about 300 milliseconds.

4. The electrical receptacle of claim 1, wherein the plug component comprises a blade, a ground prong, or a combination thereof.

5. The electrical receptacle of claim 4, wherein the plug component sensor comprises a through beam sensor, a diffuse reflection sensor, a capacitance sensor, a mechanical sensor, or a combination thereof.

6. The electrical receptacle of claim 1, wherein the receptacle is plugged into a hardwired outlet.

7. An electrical receptacle which provides power only to a properly inserted plug, said receptacle comprising:

a contact assembly, a relay assembly, two plug component sensors and a control circuit; the contact assembly being adapted and configured to conductively couple each blade of the plug to the relay assembly; the relay assembly being adapted and configured to conductively couple the contact assembly to conductors;

wherein the control circuit determines presence of a properly inserted plug and provides power only after substantially simultaneous sensing by the plug component sensors.

8. The electrical receptacle of claim 7, wherein the control circuit determines substantially simultaneous insertion of plug components.

9. The electrical receptacle of claim 7, wherein the control circuit provides power if at least two plug component sensors sense plug components within a period of about 100 to about 300 milliseconds.

10. The electrical receptacle of claim 7, wherein the plug component comprises a blade, a ground prong, or a combination thereof.

11. The electrical receptacle of claim 10, wherein the plug component sensor comprises a through beam sensor, a diffuse reflection sensor, a capacitance sensor, a mechanical sensor, or a combination thereof.

12. The electrical receptacle of claim 7, wherein the receptacle is plugged into a hardwired outlet.

13. An electrical receptacle which provides power only to a properly inserted plug, said receptacle comprising:

a contact assembly, a relay assembly, two plug component sensors and a control circuit; the contact assembly being adapted and configured to conductively couple each blade of the plug to the relay assembly; the relay assembly being adapted and configured to conductively couple the contact assembly to conductors;

wherein the control circuit determines presence of a properly inserted plug and provides power only upon sequential sensing by the plug component sensors within a predetermined period of time.

14. The electrical receptacle of claim 13, wherein the control circuit determines sensing of a blade aperture within a predetermined period of time after sensing a blade tip.

15. The electrical receptacle of claim 13, wherein the control circuit determines sensing of a plug face within a predetermined period of time after sensing a blade.

16. The electrical receptacle of claim 13, wherein the plug component comprises a blade, a ground prong, or a combination thereof.

17. The electrical receptacle of claim 16, wherein the plug component sensor comprises a through beam sensor, a diffuse reflection sensor, a capacitance sensor, a mechanical sensor, or a combination thereof.

18. The electrical receptacle of claim 13, wherein the receptacle is plugged into a hardwired outlet.

19. An electrical receptacle which provides power only to a properly inserted plug, said receptacle comprising:

a contact assembly, a relay assembly, two plug component sensors and a control circuit; the contact assembly being adapted and configured to conductively couple each blade of the plug to the relay assembly; the relay assembly being adapted and configured to conductively couple the contact assembly to conductors;

wherein after the control circuit determines improper insertion of an object into the receptacle, the control circuit provides power only after a predetermined period of time and only after substantially simultaneous sensing by the plug component sensors.

20. The electrical receptacle of claim 19, wherein the control circuit provides power if at least two plug component sensors sense plug components within a period of about 100 to about 300 milliseconds.

21. The electrical receptacle of claim 19, wherein the plug component comprises a blade, a ground prong, or a combination thereof.

22. The electrical receptacle of claim 21, wherein the plug component sensor comprises a through beam sensor, a diffuse reflection sensor, a capacitance sensor, a mechanical sensor, or a combination thereof.

23. The electrical receptacle of claim 19, wherein the receptacle is plugged into a hardwired outlet.

\* \* \* \* \*